United States Patent [19]

Wadzinske et al.

[11] Patent Number: 5,815,508
[45] Date of Patent: Sep. 29, 1998

[54] METHOD AND APPARATUS FOR PROVIDING INFORMATION BETWEEN COMMUNICATION DEVICES

[75] Inventors: Paul E. Wadzinske; Gregory A. Feeney, both of Palatine; Donald G. Newberg, Hoffman Estates, all of Ill.

[73] Assignee: Motorola, Inc., Schaumburg, Ill.

[21] Appl. No.: 728,719

[22] Filed: Oct. 11, 1996

[51] Int. Cl.$^6$ .......................... G06F 11/00; G08C 25/02
[52] U.S. Cl. ........................ 371/5.1; 371/32; 371/5.5
[58] Field of Search ................ 371/5.1, 5.5, 32, 371/33, 67.1, 68.2; 395/182.16, 185.08, 185.09; 364/944.5, 944.91, 265.1; 370/450; 358/435, 436

[56] References Cited

U.S. PATENT DOCUMENTS

| | | | |
|---|---|---|---|
| 4,839,891 | 6/1989 | Kobayashi et al. | 370/231 |
| 4,887,162 | 12/1989 | Arai | 358/400 |
| 5,144,644 | 9/1992 | Borth | 375/341 |
| 5,181,209 | 1/1993 | Hagenauer et al. | 371/43.7 |
| 5,351,274 | 9/1994 | Chennakeshu et al. | 375/347 |
| 5,363,413 | 11/1994 | Vos | 375/340 |
| 5,377,188 | 12/1994 | Seki | 370/445 |
| 5,467,341 | 11/1995 | Matsukane et al. | 371/5.5 |
| 5,487,072 | 1/1996 | Kant | 371/5.1 |

OTHER PUBLICATIONS

S.B. Calo and M.C. Easton, "A Broadcast Protocol for File Transfer to Multiple sites," IEEE Transactions on Communications, pp. 1701–1707, Nov. 1981.

K. Mase et al., "Go–Back–N ARQ Schemes for Point-to-Multipoint Satellite Communications," IEEE Transactions on Communications, pp. 583–589, Apr. 1983.

D. Towsley and S. Mithal, "A Selective Repeat ARQ Protocol for a Point to Multipoint Channel," Proc. 6th Annual Conference of the IEEE Computer and Communication Society, pp. 521–526, 1987.

Y. Ymauchi, "On the Data Transmission Delay of the Multiple Mobile Packet Radio," Proc. of the IEEE Annual Vehicular Technology Conference, pp. 426–428, 1991.

*Primary Examiner*—Trinh L. Tu
*Attorney, Agent, or Firm*—Daniel C. Crilly

[57] ABSTRACT

A first communication device (e.g., 103), which includes an unsuccessful transmission attempt counter (203) and an information transmitter (207), provides information to a second communication device (e.g., 105) in the following manner. The first communication device transmits information to the second communication device. The first communication device then determines whether the second communication device received at least a portion of the information. When the second communication device has not received at least the portion of the information to produce an unsuccessful transmission attempt, the first communication device determines whether a quantity of unsuccessful transmission attempts is less than a first threshold value. When the quantity of unsuccessful transmission attempts is less than the first threshold value, the first communication device retransmits the information to the second communication device. Otherwise, the first communication device queues or terminates transmission of the information.

19 Claims, 3 Drawing Sheets

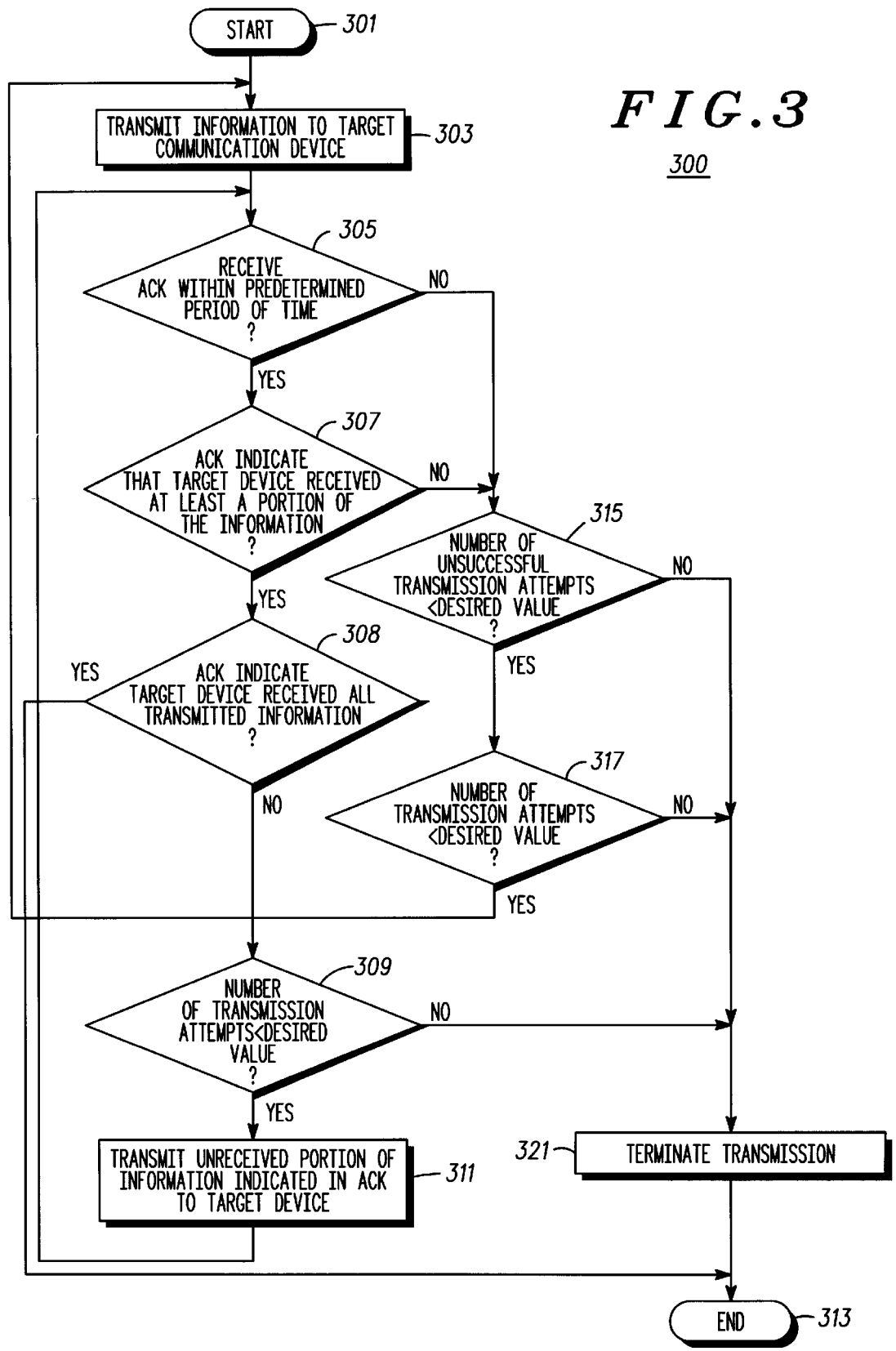

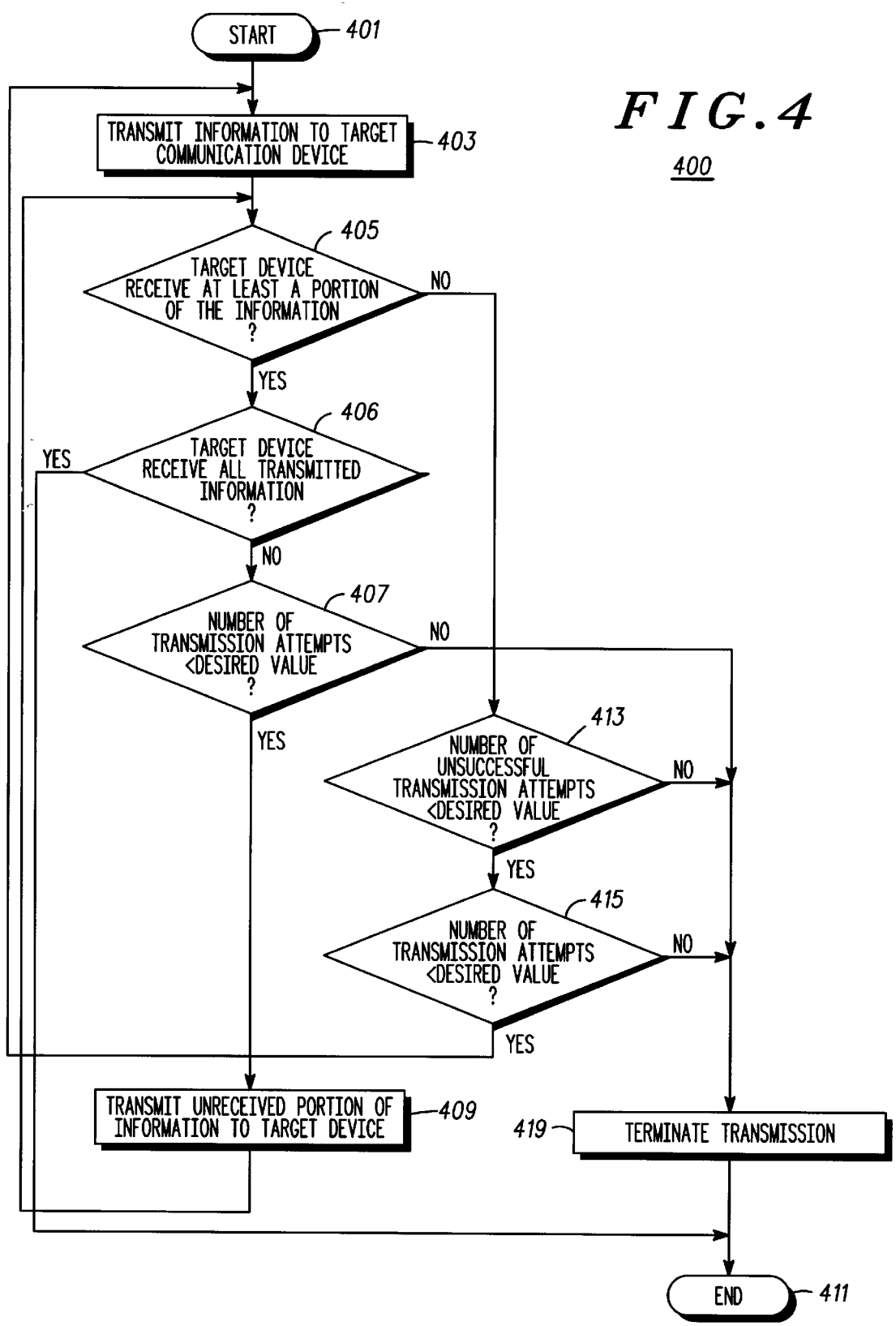

METHOD AND APPARATUS FOR PROVIDING INFORMATION BETWEEN COMMUNICATION DEVICES

FIELD OF THE INVENTION

The present invention relates generally to communication devices and, in particular, to providing information from a first communication device to a second communication device, while efficiently utilizing communication channels.

BACKGROUND OF THE INVENTION

Communication systems are known to include two or more communication devices that transfer information between themselves. In one such communication system, a packet data communication system, one communication device (sending device) transmits one or more data packets to another communication device (receiving device). The sending device typically divides each data packet into sequential data blocks, each having a sequence identifier. The sending device then transmits a group of data blocks to the receiving device. Upon receiving some or all of the transmitted data blocks, the receiving device transmits an acknowledgment to the sending device. The acknowledgment either simply acknowledges receipt of all the transmitted blocks or identifies, by sequence number, those blocks that were not recovered due to bit errors or outbound (sender to receiver) collisions.

Upon receiving the acknowledgment, the sending device either transmits the next sequence of data blocks or retransmits those data blocks not received by the receiving device. To insure that the sending device does not continue retransmitting data blocks in perpetuity, the sending device includes a counter that counts the number of transmission attempts for each transmission (e.g., each group of data blocks). When the number of transmission attempts reaches its maximum and the receiving device has still not received all the data blocks constituting the original transmission, the sending device either queues or terminates the transmission. Thus, when the number of transmission attempts reaches its maximum, the sending device presumes that the receiving device cannot reliably receive any information at the present time due to, for example, link failure, collisions with information transmitted by other senders, allocation of a high error channel, or, if the sending and receiving devices are radio communication devices, the receiving device being outside the coverage range of the sending device.

Although existing retransmission or retry techniques, such as transport control protocol (TCP), prevent neverending retransmission attempts, they do not take into account whether progress is being made during each retransmission attempt. For example, if the retransmission attempt maximum is set for five attempts and the receiving device either acknowledges receipt of the same data blocks for the first two transmission attempts or does not respond to the first two transmission attempts, the existing retry procedures continue to perform all five transmission attempts even though no apparent progress has been made between the first and second transmission attempts. Thus, existing retransmission techniques may utilize a communication channel for longer than really necessary when attempting to complete a preset number of retransmission attempts. By utilizing communication channels longer than actually necessary, present retry techniques do not make efficient use of limited communication resources because, instead of utilizing a resource for futile retransmissions, the resource could alternatively be used by another communication device to convey another communication.

Therefore, a need exists for a method of providing communications between communication devices that takes transmission progress into account to more efficiently utilize communication resources.

BRIEF DESCRIPTION OF THE DRAWINGS

FIG. 3 illustrates a logic flow diagram of steps executed by a first communication device to provide information to a second communication device in accordance with a preferred embodiment of the present invention.

FIG. 4 illustrates a logic flow diagram of steps executed by a first communication device to provide information to a second communication device in accordance with an alternative embodiment of the present invention.

DESCRIPTION OF A PREFERRED EMBODIMENT

Generally, the present invention provides a method and apparatus for providing information between communication devices. A first communication device transmits information (e.g., a data packet) to a second communication device. The first communication device then determines whether the second communication device received at least a portion of the transmitted information. When the second communication device has not received at least a portion of the transmitted information, thereby resulting in an unsuccessful transmission attempt, the first communication device determines whether a quantity of unsuccessful transmission attempts is less than a desired maximum quantity of unsuccessful transmission attempts. When the quantity of unsuccessful transmission attempts is less than its maximum, the first communication device retransmits the information to the second communication device. However, when the quantity of unsuccessful transmission attempts is greater than or equal to its maximum, the first communication device queues or terminates transmission of the information. By providing information between communication devices in this manner, the present invention permits communication channel resources to be utilized more efficiently than in existing retry techniques by anticipating when additional retransmission (retry) attempts are futile and, when such retries are futile, aborting one communication to free up a resource for another communication.

Figure 1:
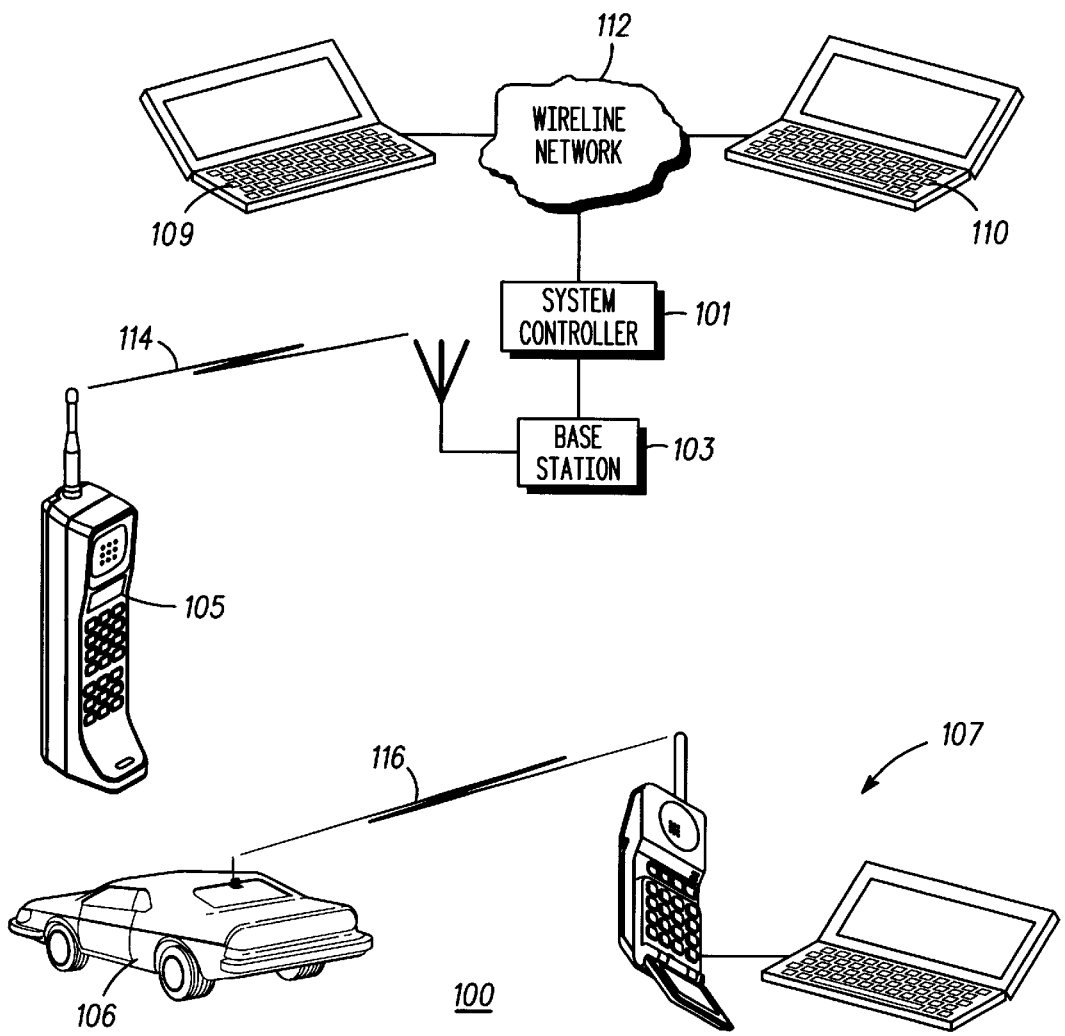
FIG. 1 illustrates a block diagram of a communication system that may beneficially employ the present invention.

The present invention can be more fully understood with reference to FIGS. 1–4. FIG. 1 illustrates a block diagram of a communication system 100 that may beneficially employ the present invention. The communication system 100 preferably includes a system controller 101 and a plurality of communication devices 103, 105–107, 109–110. Communication devices 103, 105–107 are radio communication devices that convey information via radio communication resources 114, 116, such as frequencies, time slots, or orthogonal codes. In a preferred embodiment, communication device 103 is a stationary communication device, such as a base station; whereas, communication devices 105–107 are portable communication devices, such as portable radios (e.g., device 105), mobile radios (e.g., device 106), or data terminals coupled to, or integrated with, portable radios (e.g., device 107).

Communication devices 109–110 are wireline communication devices, such as computers, that convey information via a wireline network 112, such as the public switched telephone network (PSTN), an asynchronous transfer mode (ATM) network, or an integrated services digital network (ISDN). Although a system 100 consisting of both wireline and wireless (radio) communication devices is illustrated in FIG. 1, one of ordinary skill will appreciate that the present invention applies equally well to systems that include only wireless communication devices or only wireline communication devices.

Operation of the communication system 100 occurs substantially as follows in accordance with the present invention. When one communication device desires to communicate with one or more other communication devices, the former device either requests allocation of a communication resource (e.g., 114, 116, or a wireline resource in the wireline network 112) from some centralized device (e.g., the system controller 101 or a wireline switch (not shown)) in accordance with known trunking techniques or accesses the communication resource using an appropriate channel access methodology in accordance with known conventional radio techniques. Upon allocation of, or accession to, the communication resource, the communication devices begin communicating. For purposes of illustrating the present invention, it is assumed that stationary communication device 103 is in the process of providing information packets to portable communication device 105. However, one of ordinary skill will appreciate that the below-described procedure is equally applicable to communications between portable radio communication devices (e.g., 106, 107), wireline communication devices (e.g., 109, 110) or radio and wireline communication devices.

The transmitting communication device (communication device 103) transmits one or more information packets to the receiving communication device (communication device 105) via an allocated communication resource 114. In a preferred embodiment, each information packet is divided into data blocks and transmitted by groups of data blocks. If communication device 105 receives any of the data blocks, the communication device 105 transmits an acknowledgment to communication device 103 indicating which blocks of each information packet has not been received. For example, if communication device 103 transmitted one information packet in a group of ten data blocks and communication device 105 received data blocks 1–5, 8, and 10, then communication device 105 would acknowledge receipt of those blocks by transmitting an acknowledgment (ACK) indicating that data blocks 6, 7, and 9 had not been received. Thus, the ACK provides a response from which communication device 103 can determine whether communication device 105 received at least a portion of the transmitted information.

Communication device 103 includes two counters, one for counting a quantity of transmission attempts and one for counting a quantity of unsuccessful transmission attempts. A transmission attempt is considered unsuccessful when at least a particular number of the data blocks (e.g., one) are not acknowledged as received by the communication device 105. When at least the particular number of data blocks are received and acknowledged by the receiving communication device, the transmission attempt is considered successful. Accordingly, upon transmitting the information packet or packets to communication device 105, communication device 103 increments (increases) its transmission attempt counter. Subsequently, upon receiving an ACK from communication device 105, communication device 103 either increments its unsuccessful transmission attempt counter, resets its unsuccessful transmission attempt counter, or leaves its unsuccessful transmission attempt counter unchanged. When the ACK indicates receipt of at least the particular number of data blocks, communication device 103 either resets its unsuccessful transmission attempt counter or leaves the counter unchanged depending upon which approach (reset or accumulation) provides better performance given the particular system configuration. When no ACK is received within a predetermined period of time (e.g., 1 second) or the ACK indicates that less than the particular number of data blocks were received, communication device 103 increments its unsuccessful transmission attempt counter.

Upon receiving an ACK or not receiving an ACK within the predetermined time period, communication device 103 compares the quantity of transmission attempts with a first desired maximum value and the quantity of unsuccessful transmission attempts with a second desired maximum value. In a preferred embodiment, the transmission attempt maximum value is five and the unsuccessful transmission attempt maximum value is three. Thus, the transmission attempt maximum value is preferably more than the unsuccessful transmission attempt maximum value. It should be noted that the unsuccessful transmission attempt maximum may be even lower (e.g., one or two) when communication device 103 resets the unsuccessful transmission attempt counter upon determining that a transmission attempt was successful because, in this case, the unsuccessful transmission attempt counter is keeping track of successive unsuccessful transmission attempts.

As long as both the quantity of transmission attempts and the quantity of unsuccessful transmission attempts are less than their respective maximum values, communication device 103 transmits or retransmits information to communication device 105. For example, when the ACK indicates that some data blocks have been received, communication device 103 retransmits that portion of the information packet that was not received. When the ACK indicates that no data blocks were received, communication device 103 retransmits the entire previously transmitted information. However, when the ACK indicates that the complete transmission was received, communication device 103 continues transmitting additional information packets or groups of data blocks, as necessary, to complete the communication.

When either the quantity of transmission attempts or the quantity of unsuccessful transmission attempts is greater than or equal to its respective maximum value, communication device 103 terminates or queues the transmission. In this case, communication device 103 determines that the communication resource 114, or channel, being used to convey the information is corrupted (e.g., due to high bit errors or collisions) for one of a variety of reasons, such as communication device 105 is out of the transmission range of communication device 103, communication device 103 is out of the transmission range of communication device 105, or communication device 105 is positioned in an area within the transmission range of communication device 103, but not conducive to reception of radio signals (e.g., behind or inside a building).

Thus, as described above, the present invention provides a technique for transmitting information between communication devices that is more resource efficient than current retry techniques. The present invention not only monitors a total number of transmissions (successful and unsuccessful), but also independently monitors the number of unsuccessful transmission attempts to determine whether the transmissions (including retransmissions) are making progress. Upon determining that the transmissions are not proceeding (i.e., the quantity of unsuccessful transmission attempts has reached its maximum value), the present invention aborts the communication, thereby placing the communication resource used for the previous transmissions back into the resource pool for use by other communication devices more quickly than existing retry techniques that rely exclusively on monitoring the total number of transmissions. In addition, by monitoring both the number of transmissions and the number of unsuccessful transmissions, the present invention permits those information transfers that are making progress to continue until the maximum number of transmissions is reached, while stopping those transfers that are not making progress when the maximum number of unsuccessful transmissions is reached.

Figure 2:
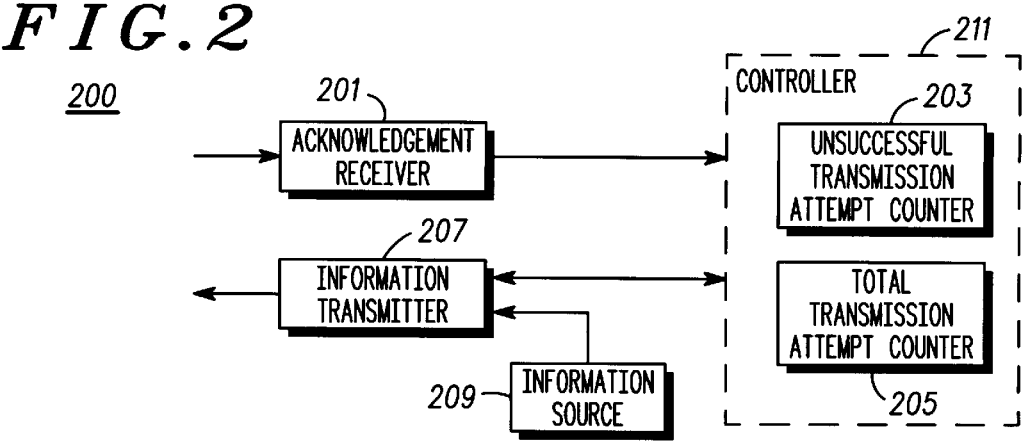
FIG. 2 illustrates a block diagram of a communication device in accordance with a preferred embodiment of the present invention.

FIG. 2 illustrates a block diagram of a communication device 200 in accordance with a preferred embodiment of the present invention. The communication device 200 includes an acknowledgment receiver 201, an unsuccessful transmission attempt counter 203, a total transmission attempt counter 205, an information transmitter 207, and an information source 209. The acknowledgment receiver 201 preferably comprises well-known circuitry and software used to receive packetized acknowledgments. The counters 203, 205 preferably comprise software routines running on a control device 211, such as a microprocessor. The information transmitter 207 preferably comprises well-known circuitry and software used to transmit and retransmit data packets or portions thereof. The information source 209 comprises the source of the data to be transmitted (e.g., a random access memory device).

Operation of the preferred communication device 200 occurs substantially as follows. The acknowledgment receiver 201 receives an ACK from a receiving or target device and forwards the ACK to the controller 211 for evaluation. When either the ACK indicates that no portion of previously transmitted information was received by the target device or no ACK was received from the target device within a predetermined time period after the previous transmission of information, the controller 211 increments the unsuccessful transmission attempt counter 203. The controller 211 then compares the values of the two counters 203, 205 with their respective threshold values. When both counter values are below their respective threshold values, the controller 211 instructs the information transmitter 207 to retrieve the information from the information source 209 and retransmit the information to the target device. Upon retransmitting the information, the total transmission attempt counter 205 is incremented to reflect the transmission. However, when either counter value is greater than or equal to its respective threshold value, the controller 211 terminates or queues transmission of the information, and resets the counters 203, 205.

FIG. 3 illustrates a logic flow diagram 300 of steps executed by a first communication device to provide information to a second communication device in accordance with a preferred embodiment of the present invention. The logic flow begins (301) when the first, or sending, communication device transmits (303) information to the second, or target, communication device and increments a total quantity of transmission attempts. The information may be one or more analog or digital information packets or portions thereof (e.g., data blocks). Upon performing the transmission, which may have been an original transmission of the information or a retransmission of the information, the sending device determines (305) whether it received an ACK from the target device within a predetermined period of time (e.g., 1 second) after the transmission. When an ACK has been received, the sending device determines (307) whether the ACK indicates that the target device received at least a portion of the transmitted information. In the preferred embodiment, the sending device determines whether the target device received at least a portion of the transmitted information by determining whether the number of data blocks identified in the ACK is less than the number of data blocks transmitted. That is, the sending device determines whether the target device received at least one data block.

When the ACK indicates that the target device received at least a portion of the transmitted information, the sending device determines (308) whether the ACK indicates that the target device received all the transmitted information. When the ACK indicates that the target device received all the transmitted information, the transmission is complete and the logic flow ends (313). In the preferred embodiment, decision blocks 307 and 308 are executed simultaneously.

When the ACK indicates that the target device received at least a portion, but not all, of the transmitted information, the communication is considered to be making progress and the sending device determines (309) whether the total quantity of transmission attempts (successful and unsuccessful) is less than a desired total transmission attempt threshold value. When the total quantity of transmission attempts is less than the desired total transmission attempt threshold value, the sending device transmits (311) the unreceived portion of the information indicated in the ACK to the target device and increments the total quantity of transmission attempts. The logic flow then continues at execution block 305. For example, if the sending device initially transmitted (i.e., in execution block 303) data blocks 1, 3, 5, and 7 as a retransmission and the received ACK indicated that data blocks 1 and 5 were not received, the sending device would then transmit data blocks 1 and 5 in execution block 311 and increments the total quantity of transmission attempts. However, when the total quantity of transmission attempts is greater than or equal to the desired total transmission attempt threshold value, the sending device terminates (321) the transmission and the logic flow ends (313).

When either the ACK is not received within the predetermined period of time after transmission or the received ACK indicates that the target device did not receive at least a portion of the transmitted information, the communication is considered to be not making progress. In this case, the sending device increments the quantity of unsuccessful transmission attempts and determines (315) whether the quantity of unsuccessful transmission attempts is less than a desired unsuccessful transmission attempt threshold value. When the quantity of unsuccessful transmission attempts is less than the desired unsuccessful transmission attempt threshold value, the sending device determines (317) whether the total quantity of transmission attempts is less than the desired total transmission attempt threshold value. When both the total quantity of transmission attempts and the quantity of unsuccessful transmission attempts are less than their respective threshold values, the sending device retransmits (303) the information to the target device. However, when either the total quantity of transmission attempts or the quantity of unsuccessful transmission attempts is greater than or equal to its respective threshold value, the sending device terminates (321) the transmission and the logic flow ends (313).

FIG. 4 illustrates a logic flow diagram 400 of steps executed by a first communication device to provide information to a second communication device in accordance with an alternative embodiment of the present invention. The logic flow begins (401) when the first, or sending, communication device transmits (403) information to the second, or target, communication device and increments a total quantity of transmission attempts. As discussed above, the information may be one or more analog or digital information packets or portions thereof (e.g., data blocks). Upon performing the transmission, the sending device determines (405) whether the target device received at least a portion of the transmitted information. This determination is preferably accomplished by evaluating an ACK received from the target device.

When the target device received at least a portion of the transmitted information, the sending device determines (406) whether the target device received all the transmitted information. When the target device received all the transmitted information, the transmission is complete and the logic flow ends (411).

When the sending device determines that the target device received at least a portion, but not all, of the transmitted information, the sending device determines (407) whether the quantity of transmission attempts (successful and unsuccessful) is less than a desired total transmission attempt threshold value. When the quantity of transmission attempts is less than the desired total transmission attempt threshold value, the sending device transmits (409) the unreceived portion of the information to the target device and increments the total quantity of transmission attempts. The logic flow then continues at execution block 405. However, when the quantity of transmission attempts is greater than or equal to the desired total transmission attempt threshold value, the sending device terminates (419) the transmission and the logic flow ends (411).

When the sending device determines that the target device has not received at least a portion of the transmitted information, the sending device increments both the quantity of unsuccessful transmission attempts and the quantity of transmission attempts, and determines (413) whether the quantity of unsuccessful transmission attempts is less than a desired unsuccessful transmission attempt threshold value. When the quantity of unsuccessful transmission attempts is less than a desired unsuccessful transmission attempt threshold value, the sending device determines (415) whether the quantity of transmission attempts is less than the desired total transmission attempt threshold value. When both the quantity of transmission attempts and the quantity of unsuccessful transmission attempts are less than their respective threshold values, the sending device retransmits (403) the information to the target device. However, when either the quantity of transmission attempts or the quantity of unsuccessful transmission attempts is greater than or equal to its respective threshold value, the sending device terminates (419) the transmission and the logic flow ends (411).

The present invention provides a method for providing information between communication devices. With this invention, communications, in particular packet data communications, can be terminated or queued more expediently than with existing techniques when the sending communication device determines that transmissions are not being received by a target communication device due to transmission channel corruptions or due to the target device being out of range of the sending device. Because the present invention independently monitors both the total number of transmissions attempts and the number of unsuccessful transmission attempts, the present invention allows communications to continue until the present-day total attempt threshold is reached as long as the communication transmissions are making adequate progress (i.e., the target device is receiving some data blocks during each (transmission), while aborting communications that are not making such adequate progress prior to reaching the total attempt threshold under the presumption that the target device is in an area of poor reception. By aborting (terminating or queuing) the communication when the communication appears not to be progressing, the present invention expedites the reuse of communication resources to facilitate other, more reliable communications.

While the present invention has been particularly shown and described with reference to particular embodiments thereof, it will be understood by those skilled in the art that various changes in form and details may be made therein without departing from the spirit and scope of the present invention.

We claim:

1. A method for a first communication device to provide information to a second communication device, the method comprising the steps of:

transmitting an information packet to the second communication device;

determining whether the second communication device received at least a portion of the information packet;

when the second communication device has not received at least a portion of the information packet, incrementing an unsuccessful transmission attempt counter in the first communication device to indicate that transmission of the information packet is not making progress;

incrementing a total transmission attempt counter in the first communication device the total transmission attempt counter indicating a quantity of successful and unsuccessful transmission attempts of the information packet;

determining whether a value of the unsuccessful transmission attempt counter is less than a first threshold value;

determining whether a value of the total transmission attempt counter is less than a second threshold value, the second threshold value being greater than the first threshold value;

when the value of the unsuccessful transmission attempt counter is less than the first threshold value and the value of the total transmission attempt counter is less than the second threshold value, retransmitting at least a portion of the information packet to the second communication device.

2. The method of claim 1, further comprising the step of:

when the value of the unsuccessful transmission attempt counter is greater than or equal to the first threshold value, terminating transmission of the information packet.

3. The method of claim 1, further comprising the step of:

when the value of the total transmission attempt counter is greater than or equal to the second threshold value, terminating transmission of the information packet.

4. The method of claim 1, further comprising the steps of:

when the second communication device has received at least a portion of the information packet, determining whether the value of the total transmission attempt counter is less than the second threshold value; and when the value of the total transmission attempt counter is less than the second threshold value and the second communication device has not received all portions of the information packet, transmitting a portion of the information packet that has not been received by the second communication device to the second communication device.

5. The method of claim 4, wherein the step of determining whether the second communication device received at least a portion of the information packet comprises the step of receiving an acknowledgment from the second communication device, wherein the acknowledgment indicates a portion of the information packet that has not been received by the second communication device.

6. The method of claim 1, wherein the step of determining whether the second communication device received at least a portion of the information packet comprises the step of receiving an acknowledgment from the second communication device, wherein the acknowledgment indicates that the second communication device has not received at least a portion of the information packet.

7. The method of claim 1, wherein the step of determining whether the second communication device received at least a portion of the information packet comprises the steps of:
determining whether the second communication device has responded within a predetermined period of time; and
when the second communication device has not responded within a predetermined period of time, determining that the second communication device has not received at least the portion of the information.

8. The method of claim 1, wherein the information packet comprises at least one digital information packet.

9. The method of claim 1, wherein the information packet comprises at least one analog information packet.

10. The method of claim 1, wherein the first communication device and the second communication device are radio communication devices.

11. The method of claim 10, wherein the first communication device is a stationary radio communication device.

12. The method of claim 10, wherein the first communication device is a portable radio communication device.

13. The method of claim 1, wherein the first communication device and the second communication device are wireline communication devices.

14. A method for a first radio communication device to provide information to a second radio communication device, the method comprising the steps of:
transmitting at least one information packet to the second radio communication device;
determining whether the second radio communication device received at least a portion of the at least one information packet;
when the second radio communication device has not received at least a portion of the at least one information packet,
incrementing an unsuccessful transmission attempt counter in the first communication device to indicate that transmission of the information packet is not making progress;
incrementing a total transmission attempt counter in the first communication device, the total transmission attempt counter indicating a quantity of successful and unsuccessful transmission attempts of the information packet;
determining whether a value of the unsuccessful transmission attempt counter is less than a first threshold value and whether a value of the total transmission attempt counter is less than a second threshold value, wherein the second threshold value is greater than the first threshold value;
when the value of the unsuccessful transmission attempt counter is less than the first threshold value and the value of the total transmission attempt counter is less than the second threshold value, retransmitting at least a portion of the at least one information packet to the second radio communication device;
when the second radio communication device has received at least a portion of the at least one information packet,
determining whether the value of the total transmission attempt counter is less than the second threshold value; and
when the value of the total transmission attempt counter is less than the second threshold value, transmitting a portion of the at least one information packet that has not been received by the second radio communication device to the second radio communication device.

15. The method of claim 14, wherein the step of determining whether the second radio communication device received at least a portion of the at least one information packet comprises the step of receiving an acknowledgment from the second radio communication device, wherein the acknowledgment indicates that the second radio communication device has not received at least a portion of the at least one information packet.

16. The method of claim 15, wherein the acknowledgment indicates a particular portion of the at least one information packet that has not been received by the second radio communication device.

17. The method of claim 14, wherein the step of determining whether the second radio communication device received at least a portion of the at least one information packet comprises the steps of:
determining whether the second radio communication device has responded within a predetermined period of time; and
when the second radio communication device has not responded within a predetermined period of time, determining that the second radio communication device has not received at least a portion of the at least one information packet.

18. The method of claim 14, further comprising the step of terminating transmission of the at least one information packet when the value of the unsuccessful transmission attempt counter is greater than or equal to the first threshold value.

19. A communication device comprising:
an unsuccessful transmission attempt counter that is incremented only when the communication device determines that a target communication device did not receive at least a portion of information previously transmitted by the communication device;
a total transmission attempt counter that is incremented upon each transmission of at least a portion of the information, regardless of whether or not such transmission is successful or unsuccessful; and
an information transmitter, coupled to the unsuccessful transmission attempt counter and the total transmission attempt counter, to retransmit information when a value of the unsuccessful transmission attempt counter is less than an unsuccessful transmission attempt threshold value and when a value of the total transmission attempt counter is less than a total transmission attempt threshold value, wherein the total transmission attempt threshold value is greater than the unsuccessful transmission attempt threshold value.

* * * * *